US011168196B2

(12) United States Patent
Haslinger et al.

(10) Patent No.: US 11,168,196 B2
(45) Date of Patent: Nov. 9, 2021

(54) SEPARATION AND UPCYCLING OF CELLULOSE-CONTAINING BLENDED WASTE

(71) Applicant: Aalto University Foundation sr, Aalto (FI)

(72) Inventors: Simone Haslinger, Aalto (FI); Michael Hummel, Aalto (FI); Herbert Sixta, Aalto (FI)

(73) Assignee: Aalto University Foundation sr, Aalto (FI)

( * ) Notice: Subject to any disclaimer, the term of this patent is extended or adjusted under 35 U.S.C. 154(b) by 202 days.

(21) Appl. No.: 16/471,001

(22) PCT Filed: Dec. 20, 2017

(86) PCT No.: PCT/FI2017/050916

§ 371 (c)(1),
(2) Date: Jun. 19, 2019

(87) PCT Pub. No.: WO2018/115584

PCT Pub. Date: Jun. 28, 2018

(65) Prior Publication Data

US 2020/0079925 A1 Mar. 12, 2020

(30) Foreign Application Priority Data

Dec. 20, 2016 (FI) ..................................... 20165990

(51) Int. Cl.
*C08J 11/08* (2006.01)

(52) U.S. Cl.
CPC ............ *C08J 11/08* (2013.01); *C08J 2301/02* (2013.01); *C08J 2367/02* (2013.01)

(58) Field of Classification Search
USPC ........................................................... 521/48
See application file for complete search history.

(56) References Cited

U.S. PATENT DOCUMENTS 5,236,959 A 8/1993 Oakley et al.
5,342,854 A 8/1994 Serad
2019/0338466 A1* 11/2019 Brinks ...................... D01F 2/00

FOREIGN PATENT DOCUMENTS

CN 105392929 A 3/2016
CN 106146877 A 11/2016
JP 2012254400 A 12/2012
WO WO2014081291 A1 5/2014

OTHER PUBLICATIONS

Database WPI: Preparation of cellulose-containing liquid comprises crushing waste textiles and pretreating; and adding mixed ionic liquid and water and vacuum stiring. Thomson Scientific, XP002777810, Nov. 23, 2016.

Database WPI: Specific fiber is isolated from blendfiber by adding blend fiber to ionic liquid and extracting specific fiber fromblend fiber dissolved in ionic liquid. Blend fiber contains >= 2 types of fibers, Thomson Scientific, XP002777811, Dec. 27, 2012.

Barat et al: Chemical scavenging of post-consumed clothes. Waste Management, vol. 46, 2015, pp. 86-93.

Briga-sà et al: Textile waste as an alternative thermal insulation building material solution. Construction and Building Materials. vol. 38, 2013, pp. 155-160.

De Silva et al: Recycling textiles: the use of ionic liquids in the separation of cotton polyester blends. RSC Advances, vol. 4, 2014, pp. 29094-29098.

H&M Foundation: Technological Breakthrough: Successful Method Found For Recycling Blend Textiles Into New Fibres. Sep. 11, 2017, Retrieved from: http://hmfoundation.com/news/technological-breakthrough-successful-method-found-forrecycling-blend-textiles-into-new-fibers/.

Hämmerle: The Cellulose Gap (The Future of Cellulose Fibres). Lenzinger Berichte, vol. 89, 2011, pp. 12-21.

Lv et al: Isolation and recovery of cellulose from waste nylon/cotton blended fabrics by 1-allyl-3-methylimidazolium chloride. Carbohydrate Polymers, vol. 123, vol. 2015, pp. 424-431.

Negulescu et al: Recycling Cotton from Cotton/Polyester Fabrics. Textile Chemist and Colorist, vol. 30 (6), 1998, pp. 31-35.

Pinkert et al: Ionic Liquids and Their Interaction with Cellulose. Chemical Reviews. vol. 190 (12), 2009, pp. 6712-6728.

Shen et al.: Enzymatic saccharification coupling with polyester recovery from cotton-based waste textiles by phosphoric acid pretreatment. Bioresource Technology, vol. 130, 2013, pp. 248-255.

Shen et al: Life cycyle assessment of man-made cellulose fibres. Lenzinger Berichte, vol. 88, 2010, pp. 1-59.

Sixta et al: Ioncell-F: A High-strength regenerated cellulose fibre. Nordic Pulp & Paper Research Journal, vol. 30 (1), 2015, pp. 43-57.

The Fiber Year, 2015.

Zamani et al: A Carbon Footprint of Textile Recycling. Journal of Industrial Ecology, vol. 19 (4), 2014, pp. 676-687.

* cited by examiner

*Primary Examiner* — Terressa Boykin
(74) *Attorney, Agent, or Firm* — Laine IP Oy

(57) ABSTRACT

According to an example aspect of the present invention, there is provided a method of separating cellulose and polyester from a material comprising a blend of cellulose and polyester, said method comprising the steps of mixing the material comprising a blend of cellulose and polyester with a first portion of superbase-based ionic liquid to dissolve a first portion of cellulose and form a first cellulose solution and a first residue comprising polyester, removing the first residue comprising polyester from the first cellulose solution, and directing the first cellulose solution to one or more further processing steps.

21 Claims, 6 Drawing Sheets

SEPARATION AND UPCYCLING OF CELLULOSE-CONTAINING BLENDED WASTE

FIELD

The present invention relates to a method of separating cellulose and polyester from a material comprising a blend of cellulose and polyester, such as cotton/polyester, viscose/polyester, e.g. rayon/polyester or modal/polyester, and lyocell fiber/polyester.

BACKGROUND

Due to the world's rapidly growing population, the demand for textiles has constantly been increasing during the past decades. In 2014, the global textile production reached 96 million tons (The Fiber Year 2015) with cotton industry still being the fastest growing segment on the market (Simpson 2012). However, the area of arable land per head has almost cut into half over a period of only fifty years implying that natural fibers such as cotton will compete for acreage with food and biofuels in the future (The Fiber Year 2015). Despite these circumstances, the consumption of cellulosic fibers per capita will have almost doubled in 2030, therefore triggering a demand for more sustainable alternatives to cotton production, which can presumably be satisfied only by man-made cellulosic fibers (MMCF) such as Viscose, Modal or Lyocell. Their production requires one fourth of the arable land used in cotton farming and 90% less water resulting in a significantly lower carbon foot print (Hämmerle 2011).

So far, these processes lack adequate recycling strategies for textile waste. In Europe, only a very small amount of worn out textiles is reused or even converted back into value added products. Almost 75% (4.3 million tons) end up in landfill directly (Briga-sã et al. 2013) mainly because of their poor recyclability. Whereas pure cellulosic waste can in general be fed back into the process (Shen et al. 2010), recycling strategies fail when it comes to blended waste garments. The most abundant blended textiles are cotton/polyester blends, which cannot be separated by means of mechanical separation due to their heterogeneity. Accordingly, most separation techniques involve either the depolymerization or the dissolution of one of the two components. Especially the dissolution of polyester is tedious as it requires elevated temperatures (DMSO) at the same time affecting the properties of the cellulosic component (Serad et al. 1994). Therefore, polyester is rather degraded than dissolved applying hydrolysis, glycolysis, or alcoholysis reactions (Oakley et al. 1993, Barot el. 2015). In an alternative method developed in a partnership between Hong Kong Research Institute of Textiles and Apparel, Ehime University and Shinshu University in Japan, and HM Foundation (http://hmfoundation.com/news/technological-break-through-successful-method-found-for-recycling-blend-textiles-into-new-fibres/), a hydrothermal treatment for the separation of cotton and polyester blends is provided. By means of the method cellulose is degraded while the PES fibres disintegrate. The PES fibres are separated mechanically from the degraded cellulose fraction and converted to yarns by yarn spinning. Nevertheless, none of these approaches leave both the cellulosic and the polyester component unaffected, nor do they provide any concepts for direct upcycling. A more promising alternative is thus the direct dissolution of the cellulosic component employing ionic liquids or NMMO. In 1998, Negulescu et al. already proposed a recycling method for cotton/polyester fabrics comprising the preparation of a 1-2% cellulose solution in NMMO and the subsequent removal of the residual polyester by filtration. As concentrations of 1-2% are not feasible on an industrial scale, the cellulose solution is reported to be further concentrated up to 15-17% using a cotton pulp obtained from an alternative extraction procedure, in which the polyester is first depolymerized before being separated from the cotton component. These additional processing steps make the method fairly complex and although subsequent fiber spinning is indicated, the article lacks any relevant data on fiber properties (Negulescu et al. 1998). Recently, a similar approach was patented attempting to extend the possible field of applications. It claims the preparation of 0.5-35% cellulose solutions from blended waste textiles in an amine oxide solvent involving a broad range of cellulosic materials and various synthetic fibers. Contrary to the previous approach, it proposes the direct spinning of the cellulose solution straight after the removal of polyester. Unfortunately, the patent does not refer to any explicit experimental data that could provide information on fiber properties such as tenacities (Brinks et al. 2014).

Even though various imidazolium derived ionic liquids have been described to dissolve cellulose (Pinkert et al. 2009), 1-allyl-3-methylimidazolium chloride (AMIM Cl) is the only one that has been studied for textile blend recycling yet. The suggested process steps resemble the methods involving NMMO. The cellulosic component is first dissolved in the ionic liquid, the synthetic fiber removed by filtration, and the cellulose regenerated by precipitation afterwards. Further applications such as the formation of films or fiber spinning are also indicated, but not demonstrated (De Silva et al. 2014, Lv et al. 2015).

Eventually, recycling strategies for cotton/polyester blends do not appear fully developed yet. An efficient, sustainable recycling concept offers convenient solutions for all processing steps including solvent and waste water recycling. The approaches discussed previously do not sufficiently comply these requirements. In many cases, they comprise the degradation of either cotton or polyester, therefore impeding the simultaneous upcycling of both components within the same process. Even more significantly, neither of them provide any proof of concept in terms of cellulosic fiber spinning.

SUMMARY OF THE INVENTION

It is an aim of the present invention to overcome at least some of the disadvantages described above and provide a method of separating cellulose and polyester from a material comprising a blend of cellulose and polyester, for example a blend of cotton and polyester, viscose and polyester, e.g. rayon and polyester or modal and polyester, and lyocell fiber and polyester whereby a material comprising a blend of cellulose and polyester is mixed with an ionic liquid to dissolve a portion of cellulose and form a cellulose solution and a residue comprising polyester. The residue comprising polyester is removed from the cellulose solution and the cellulose solution is directed to one or more further processing steps.

The process presented in the subsequent section thus attempts to overcome the weaknesses in state-of-the-art methodology by proposing a novel upcycling strategy for cellulose/polyester blended wastes e.g. textiles. Superbase-based ionic liquids, e.g. DBNH OAc, a new generation ionic liquid also employed in the Ioncell-F process (Sixta et al.

2014), is able to selectively dissolve the cotton component without any significant degradation of polyester under adequate process conditions.

The invention is defined by the features of the independent claims. Some specific embodiments are defined in the dependent claims.

According to a first aspect of the present invention, there is provided a method of separating cellulose and polyester from a material comprising a blend of cellulose and polyester, said method comprising the steps of mixing the material comprising a blend of cellulose and polyester with a first portion of superbase-based ionic liquid, e.g. DBNH OAc to dissolve a first portion of cellulose and form a first cellulose solution and a first residue comprising polyester, removing the first residue comprising polyester from the first cellulose solution, and directing the first cellulose solution to one or more further processing steps.

BRIEF DESCRIPTION OF THE DRAWINGS

Next preferred embodiments will be examined more closely with the aid of a detailed description and with reference to the attached drawings, in which.

EMBODIMENTS

By means of embodiments it has surprisingly been found that cellulose and polyester elements, for instance cotton and polyester elements of e.g. cotton/polyester blended waste garments can be separated allowing the targeted upcycling of the cellulosic part and the non-destructive recovery of polyester. After selective dissolution of the cellulose component and subsequent filtration, the resulting cellulose solution could be directly subjected to dry-jet wet spinning to produce fibers in a range of 0.5-3.0 dtex. Based on the dope concentration and composition, the tenacities of the spun fibers varied from 25-47 cN tex-1. According to the data obtained above the optimum dope concentration appears to be close to 6.5% as it facilitates the separation process and enhances the preparation of microfibers. Furthermore, the recovered PES was purified from cellulosic contaminates by two additional extraction steps, which however led to a slight degradation of PES under normal processing conditions. This problem could be minimized by an excess amount of HOAc in the ionic liquid. Solvent and waste water could be recycled by thin film evaporation.

Figure 1:
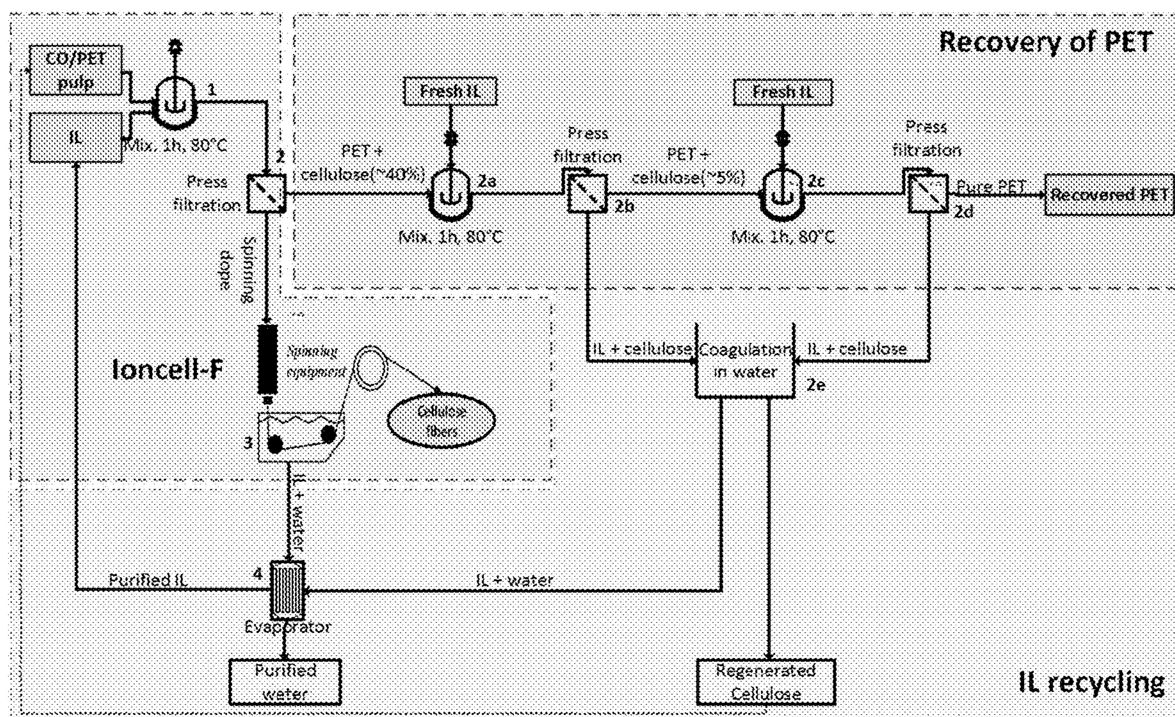
FIG. 1 illustrates a method of separating cotton and polyester from a material comprising a blend of cotton and polyester, whereby a material comprising a blend of cotton and polyester is mixed with an ionic liquid to dissolve a portion of cellulose and form a cellulose solution and a residue comprising polyester. The residue comprising polyester is removed from the cellulose solution and the cellulose solution is directed to one or more further processing step in accordance with at least some embodiments of the present invention.

FIG. 1 illustrates a process in accordance with at least some embodiments of the present invention in which a material comprising a cotton/polyester blend, e.g. a 50:50 blend is contacted with an ionic liquid e.g. DBNH OAc and is mixed (1), e.g. with a vertical kneader system, for 1 hour at 80° C., during which mixing cellulose of the cotton/polyester blend is selectively dissolved. The mixture of dissolved cellulose and undissolved polyester is then directed to a separation step (2) in which the undissolved polyester is removed from the cellulose solution via press filtration. The cellulose solution obtained in the separation step (2) is directed to dry-jet wet spinning (3) whereby the cellulose solution is placed into spinning equipment comprising a spinning unit, and heated up according to its rheological properties. After heating it is extruded into a coagulation bath through a spinneret and via an air gap. Cellulose filaments are collected on a godet and spun cellulose fibers are provided. After the separation step (2) the undissolved polyester residue comprises approximately 40% cellulose. This residue is contacted with fresh ionic liquid e.g. DBNH OAc, and is mixed (2*a*) for 1 hour at 80° C. The undissolved polyester is removed from the cellulose solution by press filtration (2*b*). This provides a polyester residue comprising approximately 5% cellulose and a solution comprising the ionic liquid, e.g. DBNH OAc, and cellulose. The polyester residue comprising approximately 5% cellulose is then contacted with fresh ionic liquid e.g. DBNH OAc, and is mixed (2*c*) for 1 hour at 80° C. The undissolved polyester is removed from the cellulose solution by press filtration (2*d*). This provides a polyester residue comprising essentially pure polyester, i.e. the cellulose content in the polyester residue is beyond the detection limit, and a solution comprising the ionic liquid, e.g. DBNH OAc, and cellulose. The ionic liquid and cellulose solutions recovered (2*b*, 2*d*) comprise concentrations of cellulose that are too low for dry-jet wet spinning. The cellulose is therefore coagulated in water and directed to the selective dissolution of cellulose step (1). The ionic liquid is directed along with water from the coagulation bath to an evaporator (4) where the ionic liquid component and water are recovered by thin film evaporation in a solvent and waste water recycling step (4). The recovered ionic liquid is then directed to the selective dissolution of cellulose step (1)

Figure 2A:
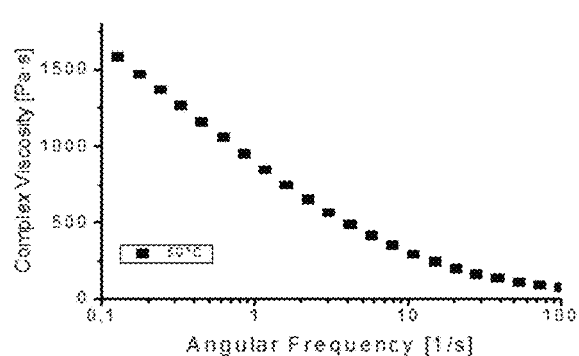
FIG. 2A is a graph in which complex viscosity of a 6.5% cellulose solution in DBNH OAc is plotted against angular frequency for measurements taken at a temperature of 50° C.

FIG. 2A is a graph in which complex viscosity of a 6.5% cellulose solution in DBNH OAc is plotted against angular frequency for measurements taken at a temperature of 50° C.

Figure 2B:
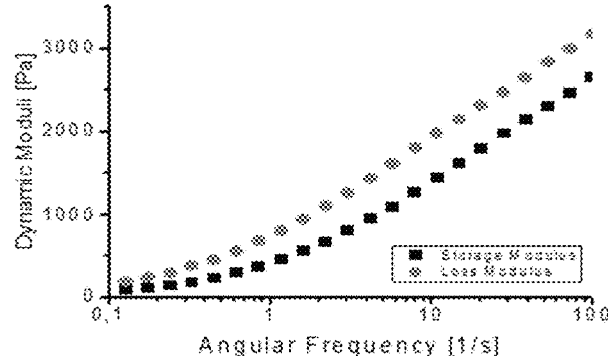
FIG. 2B is a graph in which dynamic moduli of a 6.5% cellulose solution in DBNH OAc is plotted against angular frequency.

FIG. 2B is a graph in which dynamic moduli of a 6.5% cellulose solution in DBNH OAc is plotted against angular frequency.

Figure 3:
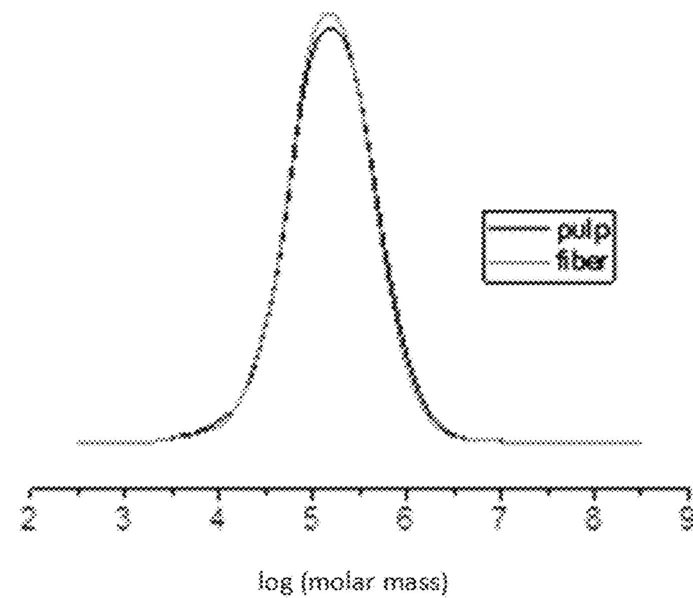
FIG. 3 is a plot of molar mass distribution of the cellulose sample of FIGS. 2A and 2B both before and after spinning.

FIG. 3 is a plot of molar mass distribution of the cellulose sample of FIGS. 2A and 2B both before and after spinning.

Figure 4A:
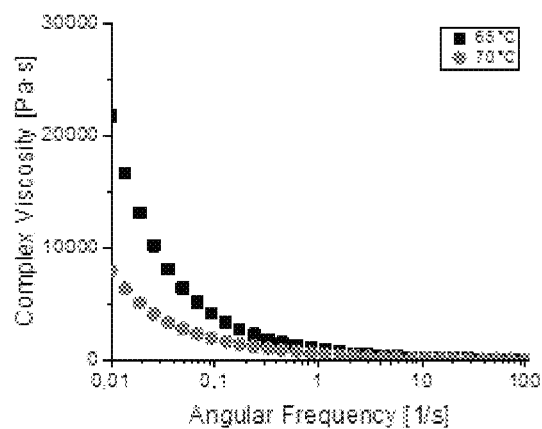
FIG. 4A is a graph in which complex viscosity of a 6.5% cellulose solution in DBNH OAc with an excess of 30% HOAc is plotted against angular frequency for measurements taken at a temperature of 65° C. and 70° C.

FIG. 4A is a graph in which complex viscosity of a 6.5% cellulose solution in DBNH OAc with an excess of 30% HOAc is plotted against angular frequency for measurements taken at a temperature of 65° C. and 70° C.

Figure 4B:
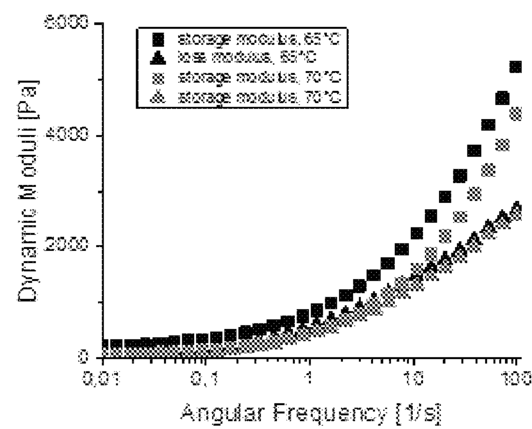
FIG. 4B is a graph in which dynamic moduli of a 6.5% cellulose solution in DBNH OAc with an excess of 30% HOAc is plotted against angular frequency for measurements taken at a temperature of 65° C. and 70° C.

FIG. 4B is a graph in which dynamic moduli of a 6.5% cellulose solution in DBNH OAc with an excess of 30% HOAc is plotted against angular frequency for measurements taken at a temperature of 65° C. and 70° C.

Figure 5:
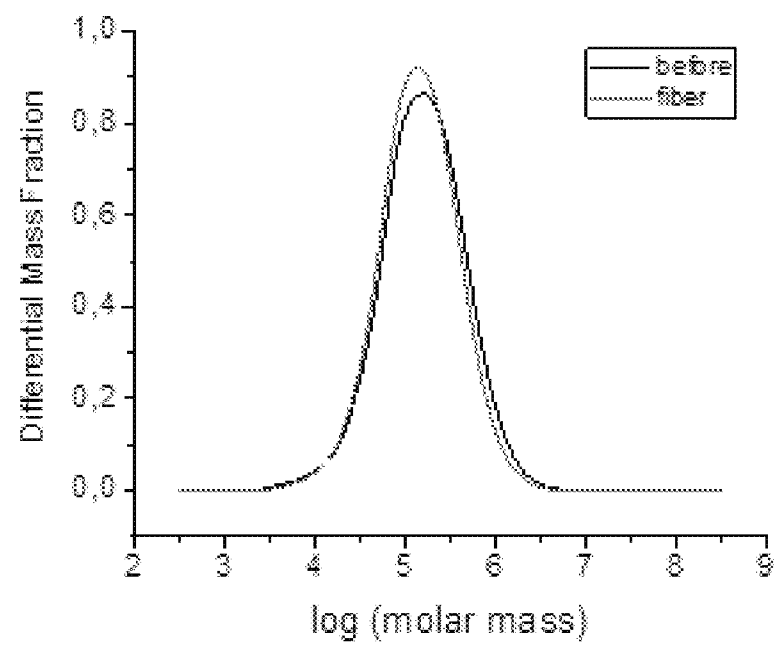
FIG. 5 is a plot of molecular mass distribution of the cellulose sample of FIGS. 4A and 4B both before and after spinning.

FIG. 5 is a plot of molecular mass distribution of the cellulose sample of FIGS. 4A and 4B both before and after spinning.

Figure 6A:
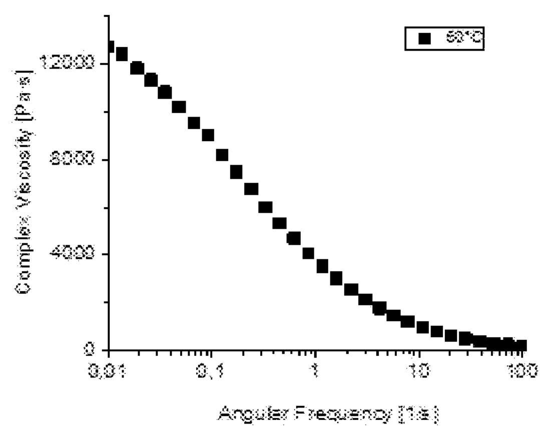
FIG. 6A is a graph in which complex viscosity of a 10.5% cellulose solution in DBNH OAc is plotted against angular frequency for measurements taken at a temperature of 60° C.

FIG. 6A is a graph in which complex viscosity of a 10.5% cellulose solution in DBNH OAc is plotted against angular frequency for measurements taken at a temperature of 60° C.

Figure 6B:
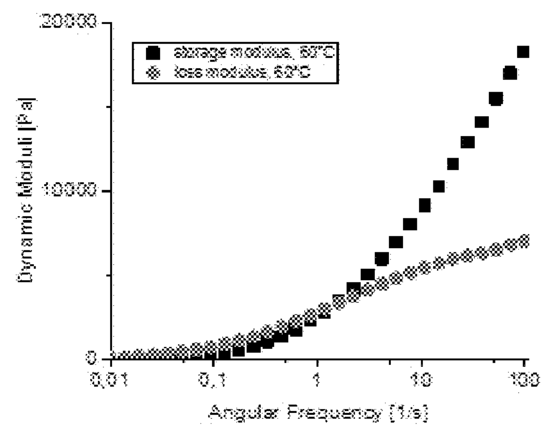
FIG. 6B is a graph in which dynamic moduli of a 10.5% cellulose solution in DBNH OAc is plotted against angular frequency for measurements taken at a temperature of 60° C.

FIG. 6B is a graph in which dynamic moduli of a 10.5% cellulose solution in DBNH OAc is plotted against angular frequency for measurements taken at a temperature of 60° C.

Figure 7:
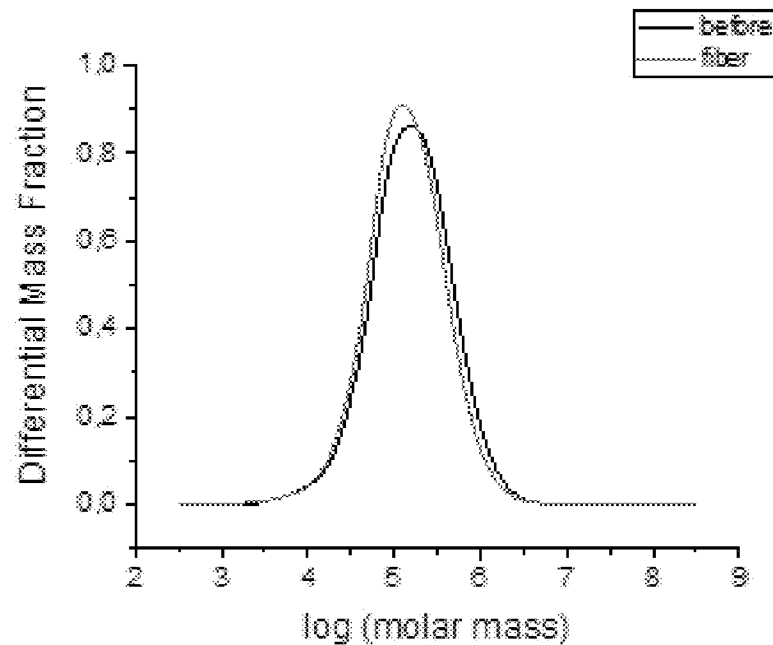
FIG. 7 is a plot of molar mass distribution of the cellulose sample of FIGS. 6A and 6B both before and after spinning.

FIG. 7 is a plot of molar mass distribution of the cellulose sample of FIGS. 6A and 6B both before and after spinning.

Figure 8A:
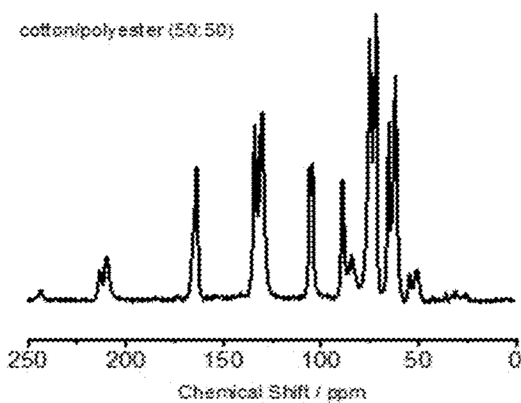
FIG. 8A shows an NMR spectrum of cotton/polyester (50:50) blend.

FIG. 8A shows an NMR spectrum of cotton/polyester (50:50) blend.

Figure 8B:
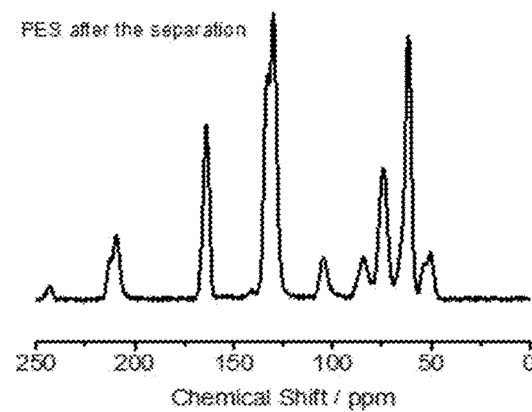
FIG. 8B shows an NMR spectrum of a first polyester residue.

FIG. 8B shows an NMR spectrum of a first polyester residue.

Figure 8C:
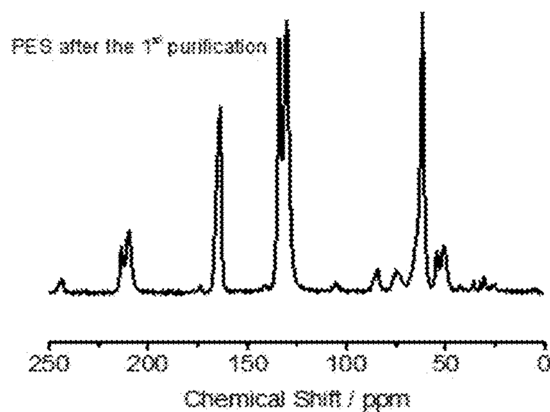
FIG. 8C shows an NMR spectrum of the polyester residue after a first purification step.

FIG. 8C shows an NMR spectrum of the polyester residue after a first purification step.

Figure 8D:
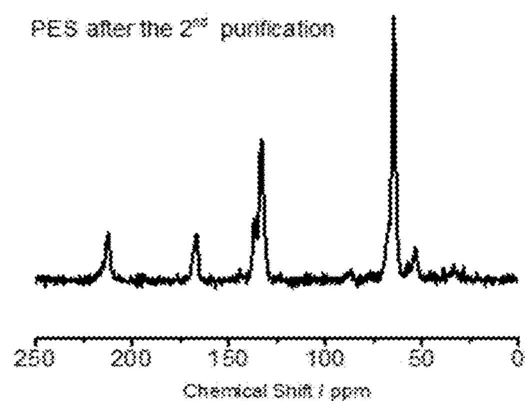
FIG. 8D shows an NMR spectrum of the polyester after a second purification step.

FIG. 8D shows an NMR spectrum of the polyester after a second purification step.

Figure 9:
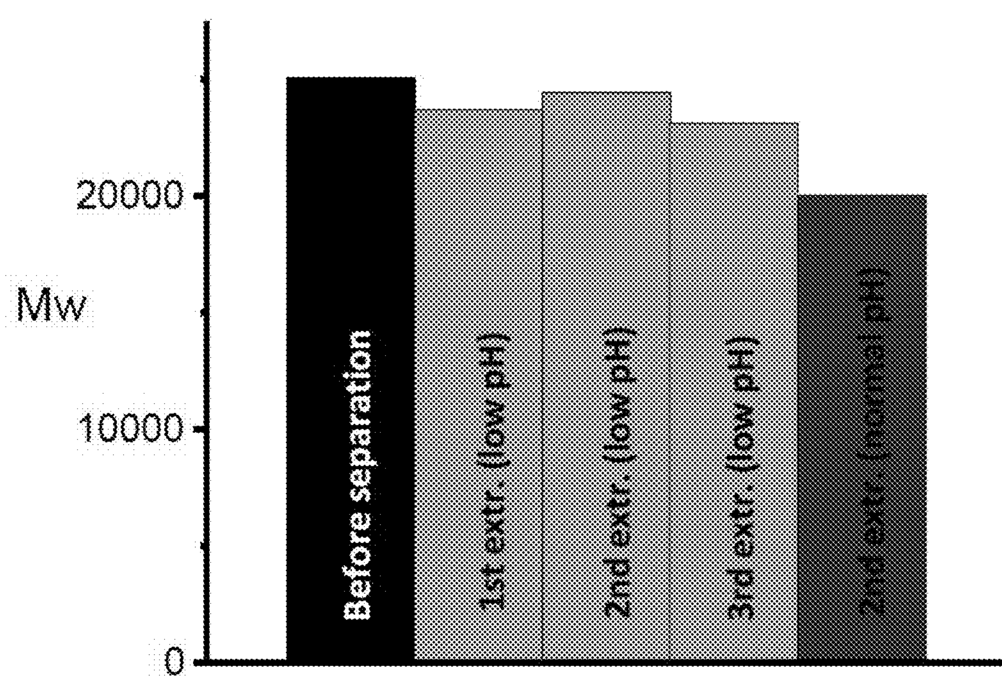
FIG. 9 shows molecular mass distributions of raw material (cotton/polyester (50:50), polyester after separation and purification with an excess of 30% HOAc, and with unmodified DBNH OAc.

FIG. 9 shows molecular mass distributions of raw material (cotton/polyester (50:50), polyester after separation and purification with an excess of 30% HOAc, and with unmodified DBNH OAc.

DETAILED DESCRIPTION

As mentioned above embodiments relate to a method of separating cellulose and polyester from a material comprising a blend of cellulose and polyester. In one embodiment the method comprise the steps of mixing the material comprising a blend of cellulose and polyester with a first portion of a superbase-based ionic liquid, e.g. DBNH OAc to dissolve a first portion of cellulose and form a first cellulose solution and a first residue comprising polyester, removing the first residue comprising polyester from the first cellulose solution, and directing the first cellulose solution to one or more further processing steps. Superbases that can form the basis for superbase-based ionic liquids include, e.g. 1,5-diazabicyclo[4.3.0]non-5-ene (DBN), 7-methyl-1,5,7-triazabicyclo[4.4.0]dec-5-ene (MTBD), 1,8-diazabicyclo[5.4.0]undec-7-ene (DBU), N,N,N,N,N,N-hexamethylphosphorimide triamide (HMPI), N,N,N,N-tetramethylguanidinium (TMG), and 1,2-dimethyl-1,1,4,5,6-tetrahydropyrimidine (DMP). Superbase-based ionic liquids are suitable ionic liquids in some embodiments. Ionic liquids used in embodiments are typically in the form of acid-superbase conjugates, in particular acetates such as DBUH OAC, preferably DBNH OAc, suitably mTBDH OAc are suitable ionic liquids in further embodiments. The cellulose and polyester blend can be any material comprising a blend of cellulose and polyester. In an embodiment the cellulose and polyester blend is a material selected from the group of a blend of cotton and polyester, a blend of viscose and polyester, e.g. rayon and polyester or modal and polyester, a blend of lyocell fiber and polyester, and a mixture thereof.

In one embodiment the one or more further processing steps to which the first cellulose solution is directed comprises a dry-jet wet spinning step, whereby the first cellulose solution is placed in a spinning unit, heated to a temperature in the range of 30 to 100° C., and extruded through a spinneret into a coagulation bath to provide cellulose filaments. The first cellulose solution can be filtered and used directly as a spinning dope. After filtration, the resulting cellulose solution can directly be used as a spinning dope in dry-jet wet spinning to obtain Lyocell type fibers ranging from 0.5 to 3.0 dtex. In a further embodiment the first cellulose solution is heated to a temperature in the range of 40 to 95° C., preferably 50 to 85° C., suitably 60 to 75° C. The temperature to which the cellulose solution is heated is related to the rheological data of the spinning dope. Tables 1, 8 and 11 show the rheological data of various spinning dopes at various temperatures.

As described above, in an embodiment the cellulose solution is extruded into a coagulation bath to provide cellulose filaments. In one embodiment the cellulose filaments are collected on a godet, where the draw ratio can be adjusted depending on the required fiber properties.

The temperature of the water coagulation bath is relatively cool in order for the cellulose solution to coagulate and form filaments. In an embodiment the coagulation bath contains water at a temperature in the range of 5 to 25° C., preferably 7 to 20° C., suitable 8 to 12° C., particularly at a temperature of 10° C.

Spinnerets are typically small, thimble-shaped, metal nozzles having fine holes through which the spinning solution is forced to form a filament. Fibres emerge from the spinneret which are then solidified by coagulation in the coagulation bath. The size and shape of the spinneret holes determine the filament's cross-section shape. Each hole forms a single filament and filaments are combined to form filament yarn. In an embodiment the spinneret is a spinneret suitable for the lyocell process. In one embodiment the spinneret is a 36×0.1×0.02 spinneret. The first number describes the number of holes in the spinneret. In a further embodiment, the spinneret has any number of holes, i.e any spinneret suitable for the lyocell process is suitable for use in embodiments of the present invention.

As well as providing spun cellulose fibres, embodiments are additionally directed to purifying polyester (PES). In an embodiment after the first dissolution the recovered polyester residue still comprises approximately 40% cellulose. Embodiments comprise further method steps for the purification of the PES residue. In one embodiment the method comprises the further steps of carrying out a first polyester purification step whereby the first residue is mixed with a second portion of superbase-based ionic liquid to dissolve a second portion of cellulose and form a second cellulose solution and a second residue comprising polyester, removing the second residue comprising polyester from the second cellulose solution, and coagulating the cellulose in the second cellulose solution and directing the cellulose obtained to one or more further processing steps.

Each of the selective cellulose dissolution steps described herein provides a PES residue that comprises less cellulose than the starting material and comprises PES that has not been degraded to a level at which it cannot be used. In fact, the PES residue provided by embodiments can be used in various applications as detailed below.

The cellulose obtained, i.e. the cellulose that is coagulated form the second cellulose solution does not comprise sufficient cellulose for dry-jet wet spinning. Thus, in a further embodiment the cellulose obtained, i.e. the cellulose that is coagulated from the second cellulose solution is directed to the first mixing step and mixed with the material comprising a blend of cellulose and polyester, and the first portion of DBNH OAc, i.e. the recovered cellulose is recycled to improve the overall yield.

In an embodiment, the PES residue recovered after the first purification step still comprises some cellulose, approximately 5%. To provide PES in which there is no detectable cellulose, a further PES purification process comprising further method steps may be carried out.

In one embodiment the method comprises the further steps of carrying out a second polyester purification step whereby the second residue is mixed with a third portion of superbase-based ionic liquid to dissolve a third portion of cellulose and form a third cellulose solution and a third residue comprising polyester, removing the third residue comprising polyester from the third cellulose solution, and coagulating the cellulose in the third cellulose solution and directing the cellulose obtained to one or more further processing steps.

As with the cellulose obtained in the first purification step, the cellulose obtained in the second purification step does not comprise sufficient cellulose for spinning. Thus, in an embodiment the cellulose obtained is directed to the first mixing step and mixed with the material comprising a blend of cellulose and polyester, and the first portion of superbase-based ionic liquid. The PES residue recovered, is essentially free of cellulose, i.e. any cellulose present is present in such a small amount that it is beyond the detection limit using $^{13}C$ solid state NMR (see FIGS. 8A-8D). The recovered PES can be reutilized in conventional industrial processes such as melt spinning.

The number of dissolutions required to provide purified PES depends on the relative amounts of PES and cellulose in the starting material as well as the species of cellulose, e.g. a 50:50 blend of cellulose PES, where the cellulose comprises cotton requires a different number of dissolutions to provide purified PES than where the cellulose comprises viscose or Lyocell.

The starting material for the method comprises a blend of polyester and cellulose. In an embodiment the material comprising a blend of cotton or viscose or Lyocell fibers and polyester comprises a blend of cellulose and polyester in a ratio of 80:20, preferably 70:30, particularly 65:45; suitably 60:40, typically 55:45, most preferably 50:50. Any cellulose-based material comprising cellulose and polyester can be separated into cellulose and polyester by means of embodiments. In other words, materials comprising any ratio of cellulose to polyester can be separated by means of embodiments.

In a further embodiment the material is pre-treated prior to the first mixing step, primarily to adjust the DP of the cellulose (target in terms of intrinsic viscosity 400-500 mL/g (SCAN method)). Such a pre-treatment may be selected from the group consisting of mechanical treatment (shredding), acid treatment, endoglucanase treatment or bleaching operations such as ozone (Z) or reinforced oxygen (O) and/or peroxide (P) bleaching. The temperature at which each mixing step takes place determines the amount of time taken in each mixing step. In one embodiment each mixing step is carried out at a temperature in the range of 25° C. to 95° C., preferably 60° C. to 90° C., particularly, 65° C. to 85° C., suitably at a temperature of 80° C.

As mentioned briefly above the temperature of the mixing step determines the amount of time taken in each mixing step. In a further embodiment each mixing step is carried out for a period of time in the range of 30 minutes to 6 hours, preferably 35 minutes to 4 hours, typically 40 minutes to 3 hours, particularly 50 minutes to 1 hour and 30 minutes, suitably for a period of 1 hour.

Various mixing devices can be used for mixing. In one embodiment each mixing step is carried out with a vertical kneader system. In a further embodiment each mixing step is carried out with a filmtruder. In another embodiment each mixing step is carried out with an extruder. In a still further embodiment, a different commercially suitable mixing device such as a vertical kneader or a filmtruder or an extruder or the like is employed to carry out each mixing step. In one embodiment each mixing step may be carried out by the same type of mixing device or optionally with a different type of mixing device.

As described earlier, mixing a cellulose/polyester blend with a superbase-based ionic liquid selectively dissolves cellulose to provide a cellulose solution an a polyester residue. The polyester residue is to be removed from the solution. In one embodiment the residue is removed from the cellulose solution by press filtration. In a further embodiment the residue is removed from the cellulose solution at a temperature in the range of 50° C. to 90° C., preferably, 60° C. to 80° C., suitably at a temperature of 70° C.

One substantial advantage provided by embodiments of the invention is that the expensive ionic liquid, e.g. DBNH OAc, used in each dissolution and polyester residue purification step can be recovered and recycled after separation from the water used in the process, which is also recovered and recycled. In an embodiment the water and superbase-based ionic liquid used in the process are recovered by thin film evaporation. After thin film evaporation, the ionic liquid is purified in one or more purification steps to remove accumulated solute degradation products, e.g hemicellulose-derived impurities.

The cellulose of the material to be separated can be from various sources. In one embodiment the material comprising a blend of cellulose and polyester comprises a cellulose component selected from the group consisting of cotton, viscose, Lyocell fiber and a mixture thereof.

The superbase-based ionic liquid may be any superbase-based ionic liquid. In one embodiment the superbase-based ionic liquid is an acetate selected from the group consisting of DBNH OAc and mTBDH OAC.

As described above, embodiments relate to spun fibers, particularly to microfibers. One embodiment provides microfibers produced by embodiments of the method described herein, wherein the fibers have a titer below 1.0 dtex. Separation of the PES from the cellulose fraction favours the production of microfibers, i.e. fibers having a dtex of <1.0. In a further embodiment, the fibers have a tenacity of >35 CNtex-1, preferably >38 CNtex-1. In a still further embodiment, the fibers have a wet-to-dry strength ratio of 0.8 or higher. Wet-to-dry strength ratio describes how much the fibers retain their strength when they become wet. Linear density (dtex), tenacity cN/tex) and elongation to break (%) were determined in both conditioned (20° C., 65% RH) and wet states using a Vibroskop-Vibrodyn system (Lenzin Instruments GmbH & Co KG, Austria). The gauge length was 20 mm, pretension 5.9±1.2 mN/tex, and speed 20 mm/min according to DIN 53816.

One embodiment describing a total process from obtaining a feedstock material to spinning cellulose fibres, recovering polyester residue and recovering and recycling water and DBNH OAc may be defined as follows:

Selective dissolution of cellulose: A CO/PES blend (50:50) is mixed with DBNH OAc for 1 h at 80° C. using a vertical kneader system. The cellulose content can vary from 6.5%-13% depending on the desired properties (i.e. high tenacities, microfibers . . . ). Separation of CO and PES: The undissolved PES is removed from the cellulose solution via press filtration at 70° C. After this step, the PES residue is still contaminated with cellulose (~40%), whereas the resulting cellulose solution can directly be subjected to dry-jet wet spinning a.&b. First PES purification step: The PES residue obtained from step 2 is mixed with fresh DBNH OAc for 1 h at 80° C. using a vertical kneader system. Subsequently, the undissolved PES is removed from the cellulose solution via press filtration at 70° C. After these two steps, the PES residue is still contaminated with cellulose (~5%).

c.&d. Second PES purification step: The steps c.&d. are repetitons of a.&b. After these steps, the cellulose content in the PES residue is beyond the detection limit.

e. Coagulation of cellulose: The concentrations of the cellulose solutions obtained from the steps 2*b*. and 2*d*. are too low for dry-jet wet spinning. The cellulose is therefore coagulated in water and reused in step 1. The resulting DBNH OAc/water mixture is recycled as described in step 4.

Dry-jet wet spinning: The purified cellulose solution resulting from step 2 is placed into a spinning unit and heated up according to its rheological properties. Subsequently, it is extruded through a 36×0.1×0.02 spinneret into a coagulation bath (water, 10° C.) via an 1 cm air gap. The filaments are collected on a godet, where the draw ratio can be adjusted depending on the required fiber properties.

Solvent and waste water recycling: DBNH OAc and water used in the process are recovered through thin film evaporation.

Examples

The following pages give a detailed process overview containing the most relevant experimental data on cellulosic fiber spinning such as rheology, molecular mass distribution (MMD), and tensile tests. A characterization (MMD, NMR) of the residual polyester is also included.

Materials and Methods:

DBNH OAc:

DBNH OAc was prepared by the neutralization of 1,5-diazabicyclo[4.3.0]non-5-ene with acetic acid (HOAc). All chemicals were used as purchased.

Cotton/Polyester Blend (50:50)

The cotton/polyester blended waste textiles were supplied by SOEX (Germany) and pretreated and shredded by VTT (Finland). Pretreatment sequence: E-Z-P-A. Further milling was conducted using a Wiley Mill.

Rheology of the Spin Dope

The shear rheology of all spin dopes was determined by applying an Anton Paar MCR 300 rheometer with a plate and plate geometry (1 mm gap size, 25 mm plate diameter). All samples were subjected to a dynamic frequency sweep over an angular velocity range of 0.1-100 s-1 at relevant temperatures (40-100° C.). Crossover points were also calculated to obtain the dynamic moduli at certain temperatures.

Tensile Tests

Linear density and tenacities (conditioned and wet) of all spun fibers were measured on a Vibroskop 400 and Vibrodym 400 (Lenzing Instrument) at 23° C. and 50% humidity. Instrument settings: gap length: 20 mm, pretension 5.9±1.2 mN tex-1, filament stretching velocity: 10 mm s-1.

GPC of the Cellulosic Material

The MMD of raw material and fibers was determined by gel permeation chromatography (GPC). Columns: precolumn (PLgel Mixed-A, 7.5×50 mm), four analytical columns (4×PLgel Mixed-A, 7.5×300 mm). Detector: RI-detector Shodex RI-101. Eluent: LiCl/DMAc (9 g1-1). Flow rate: 0.750 ml min-1. Calibration standards: pullulan standards.

NMR of PES

The contamination of the polyester residue was estimated using 13C solid state NMR. The NMR spectra were recorded on a Bruker Avance 400 MHz 5 mm (BBFO). Settings: 8 kHz, 25° C. Number of Scans: 8000.

GPC of PES

The MMD of raw material and PES was determined by gel permeation chromatography (GPC). Columns: precolumn (Styragel WATT054405), analytical column (Styragel HR 4E 7.8×300 mm), analytical column (Styragel HR5 7.8×300 mm). Column temperature: 40° C. Detector: RI-detector. Detector temperature: 40° C. Eluent: 1,1,1,3,3,3-hexafluoro-2-propanol (HFIP)/5 mM salt (sodium trifluoroacetate), Flow rate: 0.5 ml min-1. Calibration standard: polymethyl methacrylate standards.

A) 6.5% Cotton Dope, Solvent DBNH OAc

The 6.5% cellulose solution was spun from DR 6-8 at 50° C. (s. Tables 2-7). At DR 8, microfibers with ~0.70 dtex could be obtained. Compared to Ioncell fibers produced from virgin material (cf. Sixta et al. 2015), all fibers spun in this experiment showed slightly lower tenacities (~35 cN tex-1). These results can be attributed to the considerably low cellulose concentration in the spin dope, which also affected the rheological properties of the solution (s. Table 1, FIG. 2). A degradation of cellulose could not be observed during this process (s. FIG. 3).

Rheology:

TABLE 1

Rheological data of the 6.5% spinning dope (spinning temperature = 50)

| Temperature | η0/Pa * s | ω/rad s-1 | G'═G"/Pa |
|---|---|---|---|
| 40 | 11369 | 6.95E−01 | 1.18E+03 |
| 45 | 6461.1 | 1.44E+00 | 1.30E+03 |
| 50 | 2230.9 | 4.09E+00 | 1.43E+03 |
| 60 | 1439.5 | 6.90E+00 | 1.50E+03 |
| 70 | 712.72 | 1.37E+01 | 1.57E+03 |
| 80 | 402.6 | 2.58E+01 | 1,6544E |

Tensile Tests:

TABLE 2

Fibers spun at DR 8, conditioned test

| | Titer/dtex | Elong./% | Ten./cN tex-1 |
|---|---|---|---|
| Average | 0.75 | 7.29 | 34.82 |
| Std. dev. | 0.10 | 1.35 | 5.17 |
| CV % | 12.96 | 18.51 | 14.84 |

TABLE 2-continued

| Fibers spun at DR 8, conditioned test | | | |
|---|---|---|---|
| | Titer/dtex | Elong./% | Ten./cN tex-1 |
| Maximum | 0.89 | 8.7 | 43.38 |
| Minimum | 0.58 | 5.2 | 27.60 |

TABLE 3

| Fibers spun at DR 8, wet test | | | |
|---|---|---|---|
| | Titer/dtex | Elong./% | Ten./cN tex-1 |
| Average | 0.67 | 8.50 | 36.63 |
| Std. dev. | 0.12 | 0.74 | 5.21 |
| CV % | 17.72 | 8.66 | 14.23 |
| Maximum | 0.94 | 10.0 | 44.31 |
| Minimum | 0.53 | 7.6 | 27.77 |

TABLE 4

| Fibers spun at DR 7, conditioned test | | | |
|---|---|---|---|
| | Titer/dtex | Elong./% | Ten./cN tex-1 |
| Average | 1.09 | 7.69 | 38.63 |
| Std. dev. | 0.11 | 1.23 | 2.1 |
| CV % | 9.89 | 15.98 | 5.43 |
| Maximum | 1.25 | 8.9 | 42.39 |
| Minimum | 0.96 | 5.4 | 35.65 |

TABLE 5

| Fibers spun at DR 7, wet test | | | |
|---|---|---|---|
| | Titer/dtex | Elong./% | Ten./cN tex-1 |
| Average | 1.05 | 9.22 | 29.68 |
| Std. dev. | 0.12 | 0.9 | 2.8 |
| CV % | 11.52 | 9.73 | 9.42 |
| Maximum | 1.25 | 10.2 | 32.22 |
| Minimum | 0.84 | 7.4 | 23.03 |

TABLE 6

| Fibers spun at DR 6, conditioned test | | | |
|---|---|---|---|
| | Titer/dtex | Elong./% | Ten./cN tex-1 |
| Average | 1.43 | 7.95 | 38.09 |
| Std. dev. | 0.15 | 1.35 | 1.99 |
| CV % | 10.25 | 17.01 | 5.23 |
| Maximum | 1.71 | 9.7 | 41.48 |
| Minimum | 1.19 | 4.7 | 34.80 |

TABLE 7

| Fibers spun at DR 6, wet test | | | |
|---|---|---|---|
| | Titer/dtex | Elong./% | Ten./cN tex-1 |
| Average | 1.52 | 9.76 | 31.08 |
| Std. dev. | 0.17 | 1.05 | 2.06 |
| CV % | 11.01 | 10.8 | 6.64 |
| Maximum | 1.69 | 11.9 | 35.06 |
| Minimum | 1.23 | 8.4 | 26.77 |

B) 6.5% Cotton Dope, Solvent 1.3 HOAc: 1 DBN

As described further in the PES section, the polyester is subjected to some degradation during the separation process. It was tried to overcome this problem by adding an excess of 30% HOAc to the DBNH OAc. Although the modified ionic liquid was still able to completely dissolve the cotton component, the resulting solution exhibited gel-like properties (s. Table 8). Therefore, no crossover point of the dynamic moduli could be calculated (s. FIG. 4). Compared to the previous experiment, the dope showed worse spinability; only DR 4 could be reached. Moreover, the fibers exhibited significantly lower tenacities (s. Table 9-10), which might be due to the observed decrease of Mw during the separation and spinning steps (s. FIG. 5).

Rheology:

TABLE 8

| Rheological data of the 6.5% spinning dope (spinning temperatures = 65 and 70) | | | |
|---|---|---|---|
| Temperature | η0/Pa * s | ω/rad s-1 | G'=G"/Pa |
| 40 | 1770000 | No crossover! | No crossover! |
| 45 | 1590000 | | |
| 50 | 1070000 | | |
| 55 | 503570 | | |
| 60 | 175660 | | |
| 65 | 57949 | | |
| 70 | 20014 | | |

Tensile Tests:

TABLE 9

| Fibers spun at DR 4, conditioned test | | | |
|---|---|---|---|
| | Titer/dtex | Elong./% | Ten./cN tex-1 |
| Average | 2.65 | 8.96 | 26.94 |
| Std. dev. | 0.25 | 1.29 | 2.09 |
| CV % | 9.27 | 14.4 | 7.76 |
| Maximum | 3.08 | 11 | 29.26 |
| Minimum | 2.25 | 6.5 | 23.44 |

TABLE 10

| Fibers spun at DR 4, wet test | | | |
|---|---|---|---|
| | Titer/dtex | Elong./% | Ten./cN tex-1 |
| Average | 2.38 | 10.81 | 20.52 |
| Std. dev. | 0.2 | 1.77 | 1.35 |
| CV % | 8.47 | 16.4 | 6.58 |
| Maximum | 2.74 | 13 | 23.7 |
| Minimum | 2.11 | 7.4 | 18.36 |

C) 10.5% Cotton dope, solvent DBNH OAc

According to the decreased tenacities at 6.5% cellulose content, it was tried to affect the fiber strength by increasing the cellulose concentration to 10.5% in the spin dope. Contrary to the previous experiments, the prepared solution exhibited similar rheological properties as found in the Ioncell-F process (cf. Sixta et al. 2015, s. Table 11, FIG. 6). The tenacities also improved significantly to ~45 eN tex-1 (s. Tables 12-15). However, the preparation of a 10.5% cellulose solution from a CO/PES blend appears less efficient, as it complicates the filtration procedure due the higher viscosity of the dope (cf. Table 11), which leads to a considerably high loss of cellulosic material during the separation step. A slight degradation of the cellulose during the separation and spinning process could be observed (s. FIG. 7).

Rheology:

TABLE 11

| Rheological data of the 10.5% spinning dope (spinning temperature = 60) | | | |
|---|---|---|---|
| Temperature | η0/Pa * s | ω/rad s-1 | G'=G"/Pa |
| 50 | 28579 | 0.58083 | 3113.7 |
| 60 | 13294 | 1.4176 | 3223.5 |
| 70 | 6812 | 2.9912 | 3303.5 |
| 80 | 3844.2 | 5.7245 | 3391.9 |
| 90 | 2293.6 | 9.9222 | 3474.6 |

Tensile Tests:

TABLE 12

| Fibers spun at DR 8.8, conditioned test | | | |
|---|---|---|---|
| | Titer/dtex | Elong./% | Ten./cN tex-1 |
| Average | 1.73 | 8.65 | 47.69 |
| Std. dev. | 0.14 | 0.81 | 3.4 |
| CV % | 8.08 | 9.36 | 7.13 |
| Maximum | 1.99 | 10 | 51.51 |
| Minimum | 1.54 | 7.3 | 41.75 |

TABLE 13

| Fibers spun at DR 8.8, wet test | | | |
|---|---|---|---|
| | Titer/dtex | Elong./% | Ten./cN tex-1 |
| Average | 1.64 | 11.25 | 44.57 |
| Std. dev. | 0.19 | 0.98 | 3.34 |
| CV % | 11.44 | 8.73 | 7.49 |
| Maximum | 2.01 | 12.8 | 49.79 |
| Minimum | 1.44 | 9.7 | 39.77 |

TABLE 14

| Fibers spun at DR 8, conditioned test | | | |
|---|---|---|---|
| | Titer/dtex | Elong./% | Ten./cN tex-1 |
| Average | 2.04 | 9.1 | 44.88 |
| Std. dev. | 0.31 | 0.94 | 2.81 |
| CV % | 15.21 | 10.37 | 6.27 |
| Maximum | 2.5 | 10.2 | 47.64 |
| Minimum | 1.47 | 7.6 | 38.82 |

TABLE 15

| Fibers spun at DR 8, wet test | | | |
|---|---|---|---|
| | Titer/dtex | Elong./% | Ten./cN tex-1 |
| Average | 1.98 | 11.64 | 41.89 |
| Std. dev. | 0.16 | 0.42 | 2.59 |
| CV % | 8.08 | 3.6 | 6.19 |
| Maximum | 2.22 | 12.2 | 45.78 |
| Minimum | 1.65 | 11.1 | 36.62 |

NMR and GPC of PES

The NMR spectra below (s. FIG. 8) display the composition of the raw material, the PES residue after separation, and after the purification steps 1 and 2. After the separation step, the cellulose content in the PES residue is still considerably high, but it decreases significantly after the purification steps 1 and 2. Subsequently, the cellulose concentration should be beyond the detection limit. Regarding PES degradation, the separation of cotton and polyester and the following two PES purification steps are problematic to some extent. Although PES does not dissolve, it starts to degrade in DBNH OAc because of the considerable high basicity of the ionic liquid and the residual water present in the raw material. The Mw of PES decreased from 25 080 to 20 020 (s. Table 16, FIG. 9) after the separation and one purification step. In order to minimize the degradation, it was thus tried, as mentioned before, to lower the pKs-value of the solvent by adding an excess of 30% HOAc. In doing so, the Mw could be kept at ~23 000 over three processing steps. However, as previously also indicated, the excess amount of HOAc also influenced the spinning (i.e. lower DR) and the fiber properties (i.e. lower tenacities). For optimum conditions, further optimization steps would hence be required in this approach.

TABLE 16

| GPC data of PES before and after separation | | | | |
|---|---|---|---|---|
| | Mn | Mw | Mp | PDI |
| CO/PES (50:50) | 6 230 | 25 080 | 25 380 | 4.0 |
| [1]PET after separation | 6 520 | 23 690 | 23 200 | 3.6 |
| [1]PET after 1st purification | 6 460 | 24 420 | 24 280 | 3.8 |
| [1]PET after 2nd purification | 6 240 | 23 090 | 23 090 | 3.7 |
| [2]PET after 1st purification | 5 030 | 20 020 | 18 190 | 4.0 |

[1]Values obtained when using an excess of HOAc (30%)
[2]Unmodified DBNH OAc

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases “in one embodiment” or “in an embodiment” in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in the manufacture and recycling of textiles and in the melt spinning of polyester.

CITATION LIST

Non Patent Literature

Barot, A. A., V. K. Sinha. *Waste Manage.,* 46, 86-93 (2015).

Briga-sà, A., D. Nascimento, N. Teixeira, J. Pinto, F. Caldeira, H. Varum, and A. Paiva. *Constr. Build. Mater.,* 38, 155-160 (2013).

Brinks, G. J., G. H. Bouwhuis, P. B. Agrawal, H. Gooiljer. W.O. Patent 2014/081291 A1. 2014.

De Silva, R., X. Wang, N. Byrne. *RSC Adv.,* 4, 29094-98 (2014).

Hämmerle, F. M. *Lenzinger Berichte,* 89, 12-21 (2011).

Lv, F., C. Wang, P. Zhu, C. Zhang. *Carbohyd. Polym.,* 123, 424-31 (2015).

Negulescu, I. I., H. Kwon, B. J. Collier, J. R. Collier, A. Pendse. *Text. Chem. Color,* 30 (6), 31-35 (1998).

Oakley, E. O., F. J. Gorman, J. D. Mason. U.S. Pat. No. 5,236,959, 1993.

Pinkert, A., K. N. Marsh, S. Pang, M. P. Staiger. *Chem. Rev.,* 109, 6712-28, (2009).

Serad, S. L. U.S. Pat. No. 5,342,854, 1994.

Shen, L., M. Patel. *Lenzinger Berichte,* 88, 1-59 (2010).

Simpson, S. *Textile Outlook International,* 159, 45-70 (2012).

Sixta, H., A. Michud, L. Hauru, S. Asaadi, Y. Ma, A. W. T. King, I. Kilpeläinen, M. Hummel. *NPPRJ,* 30 (1), 43-57 (2015).

*The Fiber Year* (2015).

http://hmfoundation.com/news/technological-breakthrough-successful-method-found-for-recycling-blend-textiles-into-new-fibres/ (2017).

The invention claimed is:

1. A method of producing cellulose filaments comprising:

mixing material comprising a blend of cellulose and polyester with a first portion of a superbase-based ionic liquid to dissolve a first portion of cellulose and form a first cellulose solution and a first residue comprising polyester, removing the first residue comprising polyester from the first cellulose solution, and directing the first cellulose solution to one or more further processing steps to provide the cellulose filaments.

2. The method according to claim 1, wherein the one or more further processing steps to which the first cellulose solution is directed comprises a dry-jet wet spinning step, wherein:

the first cellulose solution is placed in a spinning unit, heated to a temperature in the range of 30 to 100° C., and extruded through a spinneret into a coagulation bath to provide the cellulose filaments.

3. The method according to claim 2, wherein the temperature is in the range of 40 to 95° C.

4. The method according to claim 2, wherein the cellulose filaments are collected on a godet.

5. The method according to claim 2, wherein the coagulation bath contains water at a temperature in the range of 5 to 25° C.

6. The method according to claim 1, further comprising:

carrying out a first polyester purification step, wherein the first residue comprising polyester is mixed with a second portion of the superbase-based ionic liquid to dissolve a second portion of cellulose and form a second cellulose solution and a second residue comprising polyester, removing the second residue comprising polyester from the second cellulose solution, and coagulating the second portion of cellulose in the second cellulose solution and directing the coagulated second portion of the cellulose to the one or more further processing steps.

7. The method according to claim 6, wherein the coagulated second portion of cellulose is directed to the mixing step and mixed with the material comprising a blend of cotton and polyester, and the first portion of superbase-based ionic liquid.

8. The method according to claim 6, further comprising:

carrying out a second polyester purification step, wherein the second residue comprising polyester is mixed with a third portion of the superbase-based ionic liquid to dissolve a third portion of cellulose and form a third cellulose solution and a third residue comprising polyester, removing the third residue comprising polyester from the third cellulose solution, and coagulating the third portion of cellulose in the third cellulose solution and directing the coagulated third portion of cellulose to the one or more further processing steps.

9. The method according to claim 8, wherein the coagulated third portion of cellulose is directed to the first mixing step and mixed with the material comprising a blend of cotton and polyester, and the first portion of superbase-based ionic liquid.

10. The method according to claim 1, wherein the material comprising a blend of cellulose and polyester comprises a blend of cellulose and polyester in a ratio of 50:50 to 80:20.

11. The method according to claim 1, wherein the material is pretreated prior to the first mixing step to adjust the degree of polymerization (DP) of the cellulose.

12. The method according to claim 1, wherein the mixing step is carried out at a temperature in the range of 25° C. to 95° C.

13. The method according to claim 1, wherein the mixing step is carried out for a period of time in the range of 30 minutes to 6 hours.

14. The method according to claim 1, wherein the first residue is removed from the first cellulose solution by press filtration.

15. The method according to claim 1, wherein the first residue is removed from the first cellulose solution at a temperature in the range of 50° C. to 90° C.

16. The method according to claim 1, wherein water and the superbase-based ionic liquid used in the method are recovered by thin film evaporation.

17. The method according to claim 1, wherein the material comprising a blend of cellulose and polyester comprises a cellulose component selected from the group consisting of cotton, viscose, Lyocell fiber, and a mixture thereof.

18. The method according to claim 1, wherein the superbase-based ionic liquid is selected from the group consisting of DBNH OAc and mTBDH OAc.

19. Microfibers produced by the method according to claim 1, wherein the microfibers have a titer below 1 dtex.

20. The microfibers according to claim 19, wherein the microfibers have a tenacity of >35 $CNtex^{-1}$ and a wet-to-dry strength ratio of 0.8 or higher.

21. The method according to claim 1, wherein the superbase-based ionic liquid comprises a superbase selected from the group consisting of 1,5-diazabicyclo[4.3.0]non-5-ene (DBN), 7-methyl-1,5,7-triazabicyclo[4.4.0]dec-5-ene (MTBD), 1,8-diazabicyclo[5.4.0]undec-7-ene (DBU), N,N,N,N,N,N-hexamethylphosphorimide triamide (HMPI), N,N,N,N-tetramethylguanidinium (TMG), and 1,2-dimethyl-1,1,4,5,6-tetrahydropyrimidine (DMP).

* * * * *